United States Patent
Gottesman et al.

(10) Patent No.: US 10,984,449 B2
(45) Date of Patent: Apr. 20, 2021

(54) METHOD AND DEVICE FOR INCREASING ADVERTISING REVENUE ON PUBLIC TRANSIT SYSTEMS VIA TRANSIT SCHEDULER AND ENUNCIATOR SYSTEMS

(75) Inventors: Russell Gottesman, Chicago, IL (US); Katherine Gottesman, Chicago, IL (US)

(73) Assignee: Commuter Advertising, Inc., Dayton, OH (US)

( * ) Notice: Subject to any disclaimer, the term of this patent is extended or adjusted under 35 U.S.C. 154(b) by 1943 days.

(21) Appl. No.: 12/259,092

(22) Filed: Oct. 27, 2008

(65) Prior Publication Data
US 2009/0112723 A1 Apr. 30, 2009

Related U.S. Application Data

(60) Provisional application No. 60/982,776, filed on Oct. 26, 2007.

(51) Int. Cl.
| | | |
|---|---|---|
| *G06Q 30/02* | (2012.01) | |
| *G08G 1/123* | (2006.01) | |
| *G08G 1/0962* | (2006.01) | |
| *G08G 1/133* | (2006.01) | |

(Continued)

(52) U.S. Cl.
CPC ..... *G06Q 30/0266* (2013.01); *G06Q 30/0241* (2013.01); *G08G 1/0962* (2013.01); *G08G 1/123* (2013.01); *G08G 1/133* (2013.01); *G09F 21/04* (2013.01); *G09F 21/049* (2020.05); *G06Q 10/1093* (2013.01)

(58) Field of Classification Search
CPC ........... G06Q 30/0266; G06Q 30/0241; G06Q 10/1093; G09F 21/049; G09F 21/04; G08G 1/0962; G08G 1/123; G08G 1/133
USPC ......................................................... 705/14
See application file for complete search history.

(56) References Cited

U.S. PATENT DOCUMENTS

| | | | | |
|---|---|---|---|---|
| 6,407,673 | B1 * | 6/2002 | Lane | ................ H04N 21/41422 340/901 |
| 7,227,475 | B1 * | 6/2007 | Provenzano et al. | .... 340/995.24 |

(Continued)

FOREIGN PATENT DOCUMENTS

WO WO 2007/109541 9/2007

*Primary Examiner* — Thuy N Nguyen
(74) *Attorney, Agent, or Firm* — Dennemeyer & Associates, LLC

(57) ABSTRACT

A device and method for increasing revenues in a transit system is provided wherein specific localized advertising of goods and services is generated and transmitted through the announcement system of transit vehicles. The device includes a transit vehicle equipped with means to track its location and produce an audio message within the vehicle based on its location. The method includes means to sell advertisement space to businesses that would otherwise not find transit advertising effective and means to cause the advertisements of local merchants and service providers to be broadcast in a vehicle in proximity to the advertiser or a specific outlet and software to run the method. Revenue from such advertisements will provide the transit authority or municipality with additional funds without the need for an investment is infrastructure and if done in accordance with the suggested method will cause little disturbance of passengers.

21 Claims, 9 Drawing Sheets

(51) Int. Cl.
*G09F 21/04* (2006.01)
*G06Q 10/10* (2012.01)

(56) References Cited

U.S. PATENT DOCUMENTS

| | | | |
|---|---|---|---|
| 2002/0057212 A1* | 5/2002 | Hamilton | G08G 1/13 340/988 |
| 2002/0060747 A1* | 5/2002 | Nonomura | 348/465 |
| 2002/0068583 A1* | 6/2002 | Murray | 455/456 |
| 2002/0069017 A1* | 6/2002 | Schmier | G08G 1/123 701/469 |
| 2002/0135515 A1* | 9/2002 | Rankin et al. | 342/385 |
| 2002/0164962 A1 | 11/2002 | Mankins et al. | |
| 2003/0143944 A1* | 7/2003 | Martin et al. | 455/3.01 |
| 2003/0192046 A1* | 10/2003 | Spehr | 725/32 |
| 2003/0220970 A1* | 11/2003 | Komsi | 709/204 |
| 2004/0227812 A1* | 11/2004 | Blair | 348/61 |
| 2005/0024189 A1* | 2/2005 | Weber | 340/425.5 |
| 2007/0174042 A1* | 7/2007 | Thompson | 704/3 |
| 2007/0242643 A1* | 10/2007 | Chandra et al. | 370/338 |

\* cited by examiner

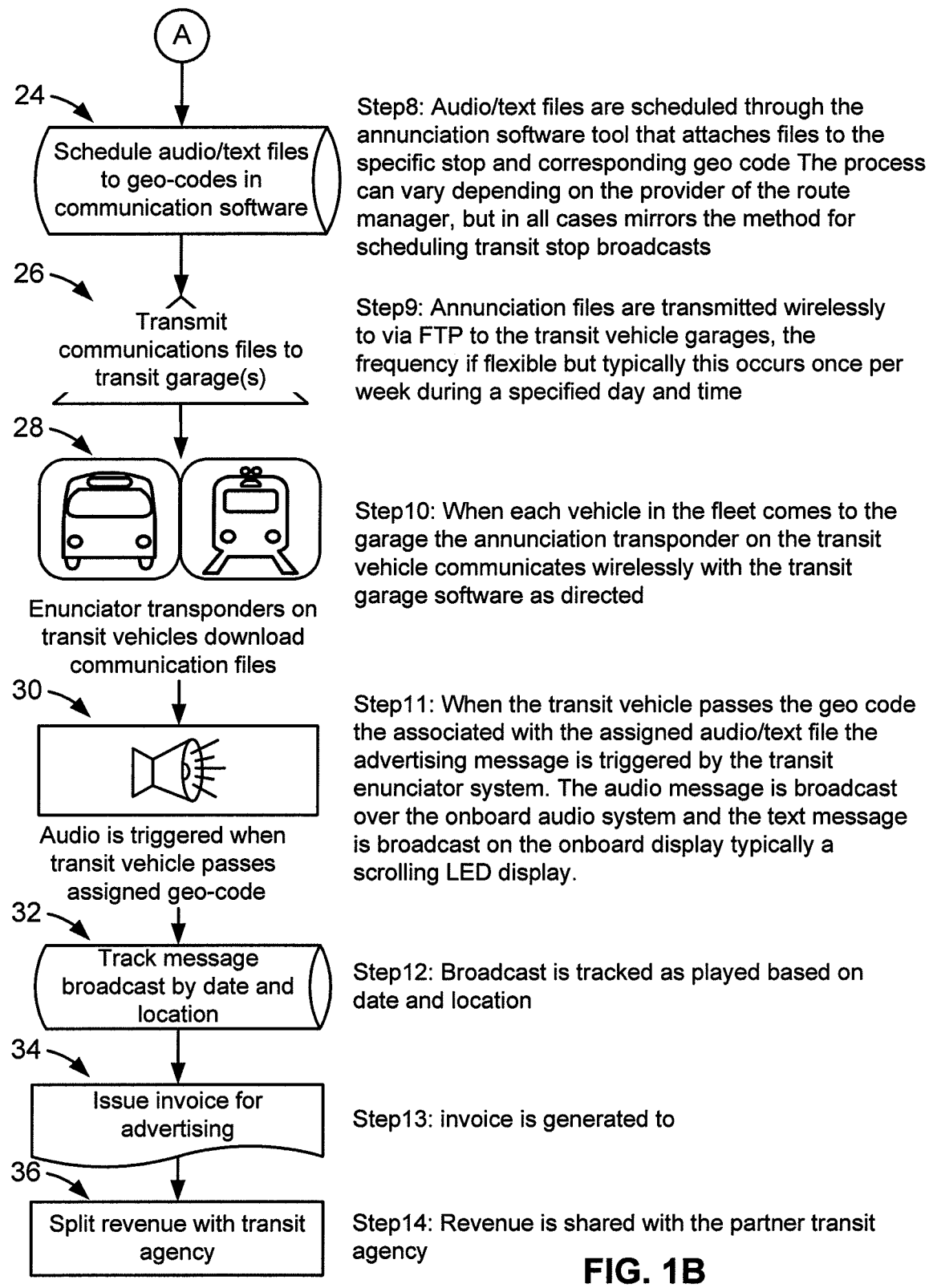

Step8: Audio/text files are scheduled through the annunciation software tool that attaches files to the specific stop and corresponding geo code The process can vary depending on the provider of the route manager, but in all cases mirrors the method for scheduling transit stop broadcasts Step9: Annunciation files are transmitted wirelessly to via FTP to the transit vehicle garages, the frequency if flexible but typically this occurs once per week during a specified day and time Step10: When each vehicle in the fleet comes to the garage the annunciation transponder on the transit vehicle communicates wirelessly with the transit garage software as directed Step11: When the transit vehicle passes the geo code the associated with the assigned audio/text file the advertising message is triggered by the transit enunciator system. The audio message is broadcast over the onboard audio system and the text message is broadcast on the onboard display typically a scrolling LED display.

Step12: Broadcast is tracked as played based on date and location

Step13: invoice is generated to

Step14: Revenue is shared with the partner transit agency

FIG. 1B

SPOT SCHEDULER BUY FORM

Client: Donut Shop
Buyer: Agency 1
Market: Dayton, OH
Stops: 1,3,7 or Fleetwide
Lines: Green, Blue
Times: 9am-11am, 5-7pm
Days: Mon-Fri
Start Date: 1.1.08
End Date: 2.1.08
Rate: $2.00, $1.00, $2.00
Frequency: every stop, every other stop, etc?
Audio Copy: Donut Shop is your town's best place for the freshest donuts.
Streaming Copy: Free coffee with donut purchase
Notes: Add music

METHOD AND DEVICE FOR INCREASING ADVERTISING REVENUE ON PUBLIC TRANSIT SYSTEMS VIA TRANSIT SCHEDULER AND ENUNCIATOR SYSTEMS

RELATED APPLICATION

This application is related to U.S. Provisional Patent Application No. 60/982,776, entitled Method of Increasing Revenues on a Public Transit System, and is incorporated in full in this application as if set forth in its entirety herein.

FIELD OF THE INVENTION

The present invention concerns a device and method for increasing revenue on a mass transit system. More particularly the present invention concerns the use of a computer system including enunciators and a global positioning system, in association with software and a transit system public announcement system to provide specific advertisement announcements to riders and thereby generate revenue.

BACKGROUND OF THE INVENTION

The majority of transit systems in major metropolitan areas worldwide, and many other areas throughout the United States, are now equipped with public enunciation systems that broadcast transit stop announcements to passengers. In the past the bus driver or conductor of a train or other conveyance would, using the public address system of the conveyance, announce the next stop to the riders. Additionally, presently some transit vehicles are equipped with an electronic visual display so that messages of importance, including the identification of the next transit stop, can be displayed. Such visual announcements are extremely helpful to the deaf or hard of hearing and can often be seen when the transit conveyance is crowded and noisy.

Public transportation authorities are typically funded by federal, state and local tax dollars as well as through passenger fares. Many transportation authorities are under constant pressure, due to rising costs, to find new sources to fund their operating budgets. If the transit budgets are not balanced commuters face fare increases or service cuts or citizens of the transit districts face tax increases, and often all three measures must be taken by authorities. As a result, publicly needed and desired transit systems may suffer and cause commuters to choose other means of transportation such as personal vehicles that add to the congestion of the roads and pollution in our cities.

Traditionally the only type of advertising on public transportation has been print advertising, either within the conveyance in small strategically placed posters or on the sides of vehicles either in large poster art or in some instances, with a vehicle being covered in an advertisement with modern adhesive graphics. However, for small advertisers, that is those advertisers that are located only in a particular part of a transit schedule map, it has been found that advertising used on transit systems is generally ineffective, particularly in large metropolitan areas, as the advertisements must be made generally of scatter shot and cannot be focused to best effect. A bus that transits through a desired advertising district also transits districts that are far and remote, such that the effectiveness of an advertisement for a localized business is lost when the bus that the advertisement is in or on transits to a another area. Further, as transit authorities often assign buses or trains for short periods and then move the rolling stock to areas needed, an advertisement on a particular bus or train may never be seen in the area where the advertisement is required. As such, small centralized businesses that might truly benefit from advertising on transit systems, cannot or do not do so because of the risk that the advertisement will not be seen and the money spent will be lost. No one wants to gamble hard earned advertising dollars on a hit or miss proposition.

There is therefore a need for an effective and targeted means to advertise on transit systems such that businesses can better target advertisements to the disparate advertising targets throughout a large metropolitan area in a cost effective manner. More specifically, there is a need for new audio media on transit vehicles that is, at once, location-based and active. Additionally, fleet-wide timed advertisements can be made to advertisers seeking a broad-based media option. Finally, a combination of timed, location-based advertisements provides maximum flexibility and targeting ability for advertisers further increasing the value of this new media. In all cases, new revenue is generated for transit authorities by the creation and sale of new media.

Such systems will benefit the advertiser, the transit system and the general public, as the costs for advertisements that are well targeted are less expensive such that the costs of products can remain low.

SUMMARY OF THE INVENTION

In accordance with the present invention, a device and method for increasing the revenues in a transit system is provided for use in transit vehicles having a public address system such as commuter trains and buses. The method includes providing localized advertising messages targeted to specific transit passage points for dissemination through the vehicle's public address system. In some transit systems, global positioning systems (GPS) and microcomputer means are used to provide passengers with information on the vehicle's scheduled stops. In these systems, the GPS system is used to continuously track the vehicle's location and at certain trigger points, a microcomputer or microprocessor, combined with tracking and other software and hardware, causes a message concerning the next stop and its proximity (and other similar information) to be broadcast within the vehicle at appropriate locations. Messages such as "Next stop Davis Street Evanston" are now automated and therefore never missed or forgotten, allowing passengers the ability to alight the system as required. Such operations previously were the task of conductors and bus drivers and, if tasked with other matters, might sometimes be neglected.

These modern systems can be used to provide information concerning delays in the buses schedule and notices of fare increases or service interruptions, as desired and programmed. In other systems, transit-centered messages to passengers can be provided based on the time and according to the schedule and likely position of the vehicle.

In embodiments of the present invention an advertisement system, for use in association with the vehicle-provided global positioning system devices, or other message scheduling means, are provided such that a specifically targeted advertisement is delivered at an appropriate place and time along a transit vehicle's route. As such, more direct and appropriate advertisements can be provided to passengers so that local merchants and service providers can get value for their advertising money.

In embodiments of the present invention, means to determine the time and place at which the advertising message will be disseminated through the address system within the transit vehicle are provided and an advertising message, appropriate to the location of the vehicle, is played. While advertising revenue is important, it will be understood that timing and scheduling can be implemented such that important transit messages are provided first and prominently before any advertisement is provided. The present invention recognizes the importance of location and safety information and means are provided such that any such message is given preference, including in many transit enunciator systems, the ability to circumvent or stop an advertisement in lieu of a station message or important safety message or the like.

It will be understood that the means to determine the time and place for dissemination of the message can include a global positioning system receiver or can merely be timed such that the schedule of the bus or train is determinative of when the message is played. In other embodiments, the train conductor or bus driver can trigger the message upon the passage of a certain milestone marker; or the message can be triggered via electronic devices, placed near to the desired message playback location, such as devices that can transmit or beam a triggering transmission, or other message, to equipment on the vehicle. It will also be understood that the triggering device or equipment can be centrally located such that the sensing of the vehicle at a location, either through a GPS and computer system (either on the vehicle or in a central location) or the passage through or by triggering sensors on the street or tracks or elsewhere, causes the central location to transmit, or otherwise send, a signal to the vehicle so that the message is disseminated.

It will be understood by persons having ordinary skill in the art, that modern transit vehicles are equipped with audio and visual address systems and that the method of the present invention can include means to use the transit vehicle address system. In some embodiments the message can include an audio and a video portion. In one embodiment, the address system is used to playback a message of between 5 and 15 words and/or between 5 and 15 seconds in length, giving the listener a brief advertisement of goods or services available nearby. In another embodiment, along with the brief audio message a similar or additional message is included on a screen within the vehicle. Vehicles are known to carry illuminated dot matrix device for visually reproducing audio messages broadcast therein as well as flat screen monitors for more vibrant displays.

In the present invention along with the message storage and playback devices of a transit vehicle, the steps of selling an advertisement message unit to an advertiser and creating the advertisement and producing an audio message are disclosed. The steps include determining one or more locations at which the audio message can be played and mapping those one or more locations on a transit system map then playing the audio message, and or video message, at one or more of the predetermined locations. The method can include the step of playing the audio message at a time and location designated by the advertiser as well as playing the audio message at staggered intervals so as not to continuously disturb passengers by making the messages ever-present.

In one embodiment, the method of the present invention includes determination of the interval for message playback and can include waiting for the time period between one or more stops and continuously changing the number of stops between the playback of the messages. In one embodiment, the interval is appropriate as determined by a number of potential factors including transit authority policies or preferences, Commuter Advertising policies or preferences, revenue goals, commuter feedback, or other relevant considerations.

It will be understood that the method of generating revenue must include a device on which to utilize the method. In the present invention an advertising revenue generator is provided. The device includes a transit vehicle, such as a train, bus or other conveyance and means to determine the location of the transit vehicle relative to the vehicle's route. Further, the device includes a microprocessor and a memory device, for storing software, data and means to implement the software as well as means to place an audio file of an advertising message in the memory and means to broadcast the audio file within the transit vehicle. The devices so configured allows an advertising message audio file to be placed in the memory of the generator which uses the microprocessor, prompted by the location determining means, to retrieve and broadcast the advertising message within the transit vehicle. It will be understood that there are any number of combinations of devices that can substituted for the above list including a global positioning device; data transmitter and receiver; an audio enunciator; software that is associated with the means to determine the location of the transit vehicle and the memory; random access memory chips; a loud speaker; and a visual display means.

A more detailed explanation of the invention is provided in the following description and claims and is illustrated in the accompanying drawings.

BRIEF DESCRIPTION OF THE DRAWINGS

FIG. 1B is a schematic representation of the method of securing advertising revenue using the method of the present invention.

FIG. 6 is a representative advertising scheduler form for use in association with embodiments of the present invention.

Figure 1:
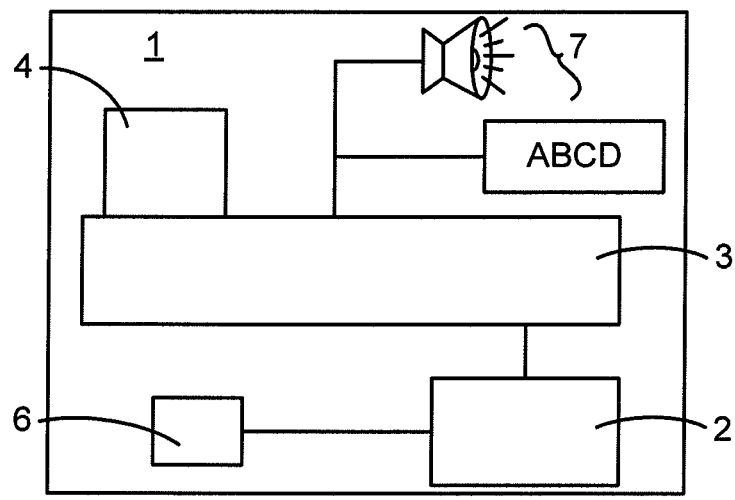
FIG. 1 is a schematic representation of an advertising revenue generator of the present invention.

An Appendix comprising the following document is attached:

*Transitmaster*™ *Intelligent Transportation System. Annunciator Studio*™ *Route Management*, release 19.2 and Above, Part #01M0077-002-A Jan. 25, 2996, Copyright Siemens VDO 1999-2006.

The Appendix is incorporated as if set forth in full herein

DETAILED DESCRIPTION OF THE ILLUSTRATIVE EMBODIMENT

While the present invention is susceptible of embodiment in various forms, there is shown in the drawings a number of presently preferred embodiments that are discussed in greater detail hereafter. It should be understood that the present disclosure is to be considered as an exemplification of the present invention, and is not intended to limit the invention to the specific embodiments illustrated. It should be further understood that the title of this section of this application ("Detailed Description of the Illustrative Embodiment") relates to a requirement of the United States Patent Office, and should not be found to limit the subject matter disclosed herein.

We have invented a new device and method for broadcasting location-based advertising messages on public transit vehicles and thereby secure increased revenues for such systems. The method utilizes new and existing technology and processes across a variety of advertising broadcast media options including audio, video, digital and text scroll media and any other electronic forms of message enunciation or display. The method is being implemented in some transit districts in the US by Commuter Advertising, Inc. of Chicago, Ill. USA, the owner of the present invention.

The broadcast messages are flexible in length, but are typically characterized in as short-form, comprising approximately 5 to 15 second, audio, video or text scroll messages that are attached to transit stops throughout transit routes. It will be understood that shorter and longer messages can be made by persons having ordinary skill in the art without departing from the novel scope of the present invention. In our study and opinion, the ideal length for such messages is between 5 and 15 seconds for the markets we have reviewed, longer or shorter messages may be better for other markets, and so the length of time noted as preferential is not meant as limiting.

The advertising model and device that we have invented is described herein and illustrated in the drawing figures. The message broadcast method provides new advertising media to transit authorities in the United States and globally.

It will be understood that the majority of transit systems in the US and many worldwide have public enunciation systems that allow for the broadcasting of transit stop announcements to passengers. In some instances, these systems are automated and in others they are manually utilized. Additionally, transit vehicles often are equipped with an electronic visual display of the transit stop information, such as the name of the stop or the street.

Referring to FIG. 1, a schematic representation of an embodiment of the revenue generator of the present invention is shown. A transit vehicle 1 includes a microprocessor 2 associated with memory 3 and file reception means 4, such as an Internet connection or a USB or other card reader port, working in association with microprocessor 2, each of a type known to persons having ordinary skill in the art and interchangeable with like devices having similar functions. The microprocessor includes software storage means, such as read only memory (ROM) or other storage device along with the appropriate software to cause the functionality described in detail below. A global position system (GPS) device 6, for providing location and tracking capability to the transit vehicle is provided and described in greater detail below. The transit vehicle 1 further includes an enunciation system 7 that includes at least a public address speaker and in some embodiments a visual message system, such as a dot matrix device or flat screen monitor on which visual messages can be displayed.

Figure 1A:
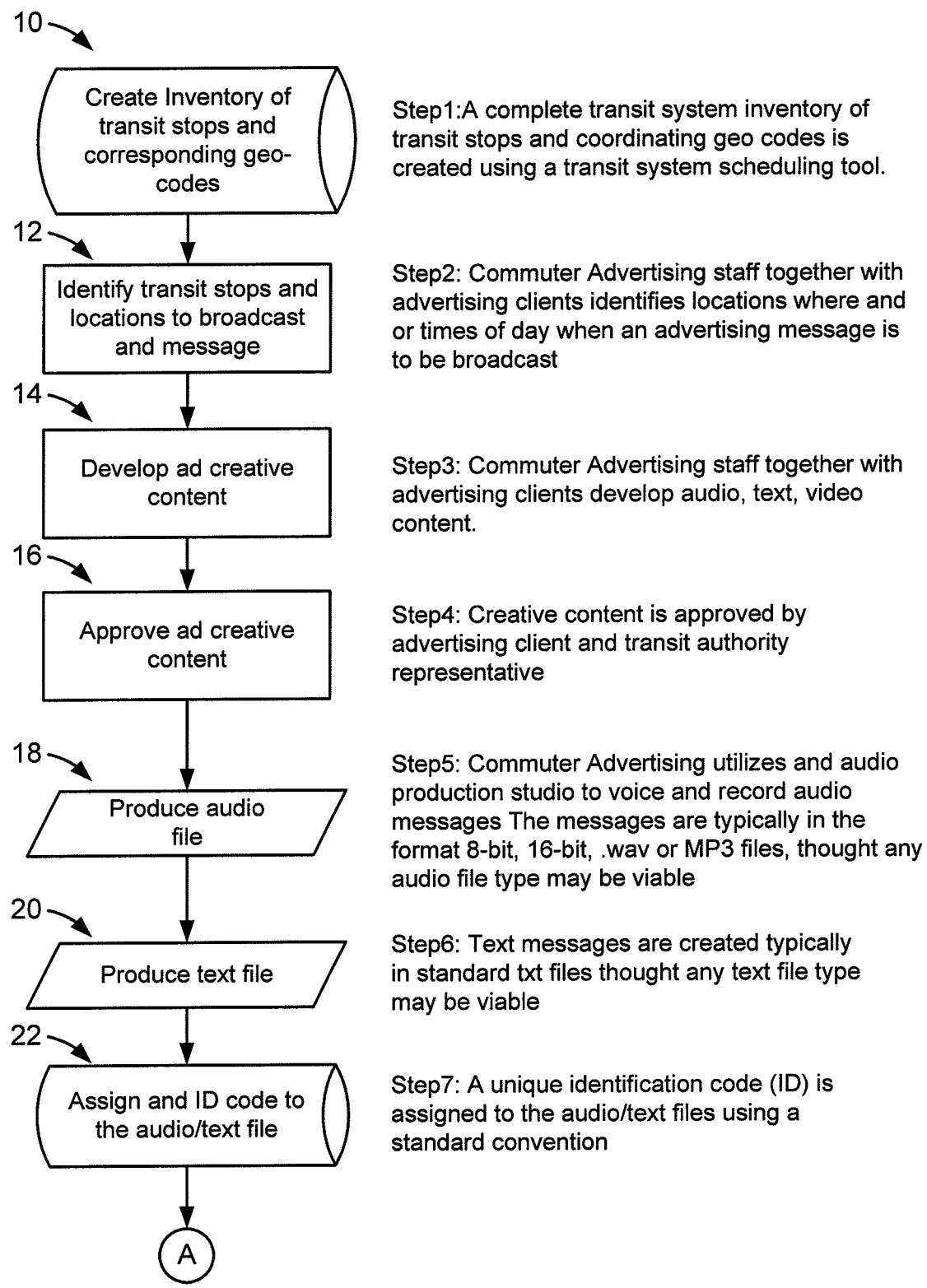
FIG. 1A is a schematic representation of the method of securing advertising revenue using the method of the present invention.

Referring now to FIG. 1*a*, a method to leverage the above-described equipment to facilitate the broadcast of advertising message is illustrated. It will be seen that the following steps are shown as follows:

Step 1 a complete transit system inventory of transit stops and the coordinating geo-codes is created using a transit system-scheduling tool 10. Step 2 an advertising staff together with an advertising client identifies locations where and/or times of day when an advertising message is to be broadcast 12. Step 3 advertising staffs together with advertising clients develop creative audio, text, and video content 14. Step 4 creative content is approved by advertising client and transit authority representative 16. Step 5 advertising staff utilizes an audio production studio to voice and record audio messages 18. The messages are typically in the format of 8 bit or 16 bit, ".wav", or MP3 files. As is known by persons having ordinary skill in the art, any audio file type may be used in the device and method of the present invention and therefore may be substituted without departing from the novel scope of the present invention.

Step 6 text messages are created 20, typically in standard .txt files, though as known by persons having ordinary skill in the art, any text file type may be used without departing from the novel scope of the present invention. Step 7 a unique identification code (ID) 22 is assigned to the audio/text files using a standard convention. For example, a sample audio list of such type would include:

StopLatitudeLongitudeRTA Standard Audio IDCommuter Ad IDWeekMain and Philadelphia 39.77634-84.200510701123456.mp3 10701000112345.mp3 3/30/2008Main and Maplewood 39.82083-84.235440702123457.mp3 10702000212346.mp3 3/30/2008Main and Helena39.79302-84.214780703123458.mp3 10703000112347.mp3 3/30/2008Main and Third39.8208-84.235480704123459.mp3 10704000512348.mp3 3/30/2008Route 7

Alternately, announcements could be programmed at a specific time, without departing from the novel scope of the present invention.

Step 8 audio/text files are scheduled through the annunciation software tool that attaches files to the specific stop and corresponding geo-code 24 (software of this type is described in greater detail below). The process can vary depending on the provider of the route manager software, but in all cases mirrors the method for scheduling transit stop broadcasts. An example process is as follows:

Open the annunciation application.
Select the type of LED sign on which messages are displayed.
Browse to select the directory containing audio files.
Zero cross adjust selection to ensure all audio files begin at zero point.
Normalize selection.
Save.
Create two additional groups: Internal and External.
Verify or change Default .wav Silence (Edit Menu)
Select AutoBuild™ Text from .wav (Edit Menu)
Select the appropriate group for the announcement being created.
Select .wav files and insert into the Audio Graphic Control Box.
(Optional) Use parameters (found under the Edit Command) to modify the visual presentation of the message.
Preview, edit, and save the audio commercial and attach to announcement.
Specify a maximum file size for the compressed files that are exported to the MDT (Announcement Menu).
Export the MDT file set (Announcement Menu).

Two additional examples, as used by Commuter Advertising of Chicago Ill. are as follows. A second method for timed announcements is as follows:
Timed announcements process is as follows:
1) Commuter Advertising sells timed announcements to run for one month starting on the 1$^{st}$ of each month 2) Advertising sales are tracked by time/month utilizing Commuter Advertising's proprietary transit audio advertising sales software
3) Commuter Advertising works with Advertiser to create desired audio content
4) Commuter Advertising production studio records audio announcement
5) Commuter Advertising obtains approval from Advertiser on audio announcement
6) Audio announcement wav files are made available to the Execution Engineer via FTP
7) Execution Engineer accesses software via remote desktop on the 1$^{st}$ of each month
8) Execution Engineer creates new timed announcement scheduled according to Commuter Advertising's sales software to run twice/hour according to the preferences of the CTA (for example :05 and :35 after each hour.)
9) Execution Engineer uploads corresponding audio for each of the 48 timed announcements sold for the month
10) Execution Engineer completes the creation and upload of timed announcements by the 12$^{th}$ of each month
11) Execution Engineer creates a distribution to be sent on the 15$^{th}$ of each month to be effective on the 1$^{st}$ of the coming month
12) Buses receive the audio updates between the 15$^{th}$ and the 30$^{th}$
13) Audio Ad campaigns are effective on the 1$^{st}$ of the month
14) The next time the Execution Engineer accesses software the previous month's ads are removed or maintained
15) Repeat process from Step 6

A third process is as follows:
Pseudo stop announcements process is as follows:
1) Commuter Advertising sells pseudo stop announcements to run for two weeks starting on the 1$^{st}$ and 15$^{th}$ of each month
2) Advertising sales are tracked by time/month utilizing Commuter Advertising's proprietary transit audio advertising sales software
3) Commuter Advertising works with Advertiser to create desired audio/text content
4) Commuter Advertising production studio records audio announcement
5) Commuter Advertising obtains approval from Advertiser on audio announcement
6) Audio announcement wav files are made available to the Execution Engineer via FTP
7) Execution Engineer accesses software via remote desktop on the 1$^{st}$ and 15$^{th}$ of each month
8) Execution Engineer initiates a change to the current audio assigned to the pseudo stops according to Commuter Advertising's sales software
9) Bus Tools™ creates a work order for the updated audio
10) Execution Engineer updates the audio file name according to the work order for that pseudo stop
11) Execution Engineer uploads corresponding audio for each of the 80 ads sold for two weeks
12) Execution Engineer also inputs 20 character-maximum text content
13) Execution Engineer completes the creation and upload of timed announcements by the 12$^{th}$ and 27$^{th}$ of each month
14) Execution Engineer creates a distribution to be sent on the 15$^{th}$ and 30$^{th}$ of each month to be effective on the 1$^{st}$ and 15$^{th}$ of the coming month respectively
15) Buses receive the audio updates between the 1$^{st}$ and 15$^{th}$ and the 15$^{th}$ and 30$^{th}$
16) Audio Ad campaigns are effective on the 1$^{st}$ of the month
17) The next time the Execution Engineer accesses software the previous month's ads are removed or maintained
18) Repeat process from Step 6

It will be understood that the above processes are illustrative and is not meant to be limiting. It will also be understood that wile the examples indicate use by "Commuter Advertising", the examples could be used by third parties, with licenses, without departing from the novel scope of the present invention.

Step 9 annunciation files are transmitted wirelessly or via FTP to the transit vehicle garages 26, the frequency of transmission is generally flexible, as will be understood, but in one embodiment transmission occurs once per week on a specified day and time. Step 10 when each vehicle in the fleet comes to the garage, the enunciator transponder on the transit vehicle communicates wirelessly with the transit garage software as directed 28, for example:

Each weekly download is considered a 'minor' merge or distribution that is simple and effective to execute The purchase schedules for advertisements are aligned with the minor merge schedule of the transit agency, allowing for maximum coordination.

Step 11 when the transit vehicle passes the geo-code the associated with the assigned audio/text file the advertising message is triggered by the transit enunciator system 30. The audio message is broadcast over the onboard audio system and the text message is broadcast on the onboard display, typically a scrolling LED display (see FIG. 1). Step 12 broadcast is tracked as played based on date and location 32. Step 13 invoice is generated to advertiser 34. Step 14 revenue is shared with the partner transit agency 36. Various modifications to the illustrative embodiment can be made by persons having ordinary skill in the art without departing from the novel scope of the present invention.

As illustrated, the method of the present invention includes transportation authorities increasing their operating revenues by leveraging existing infrastructure. The method allows for advertising messages to be broadcast through the use of scheduler and enunciator systems currently only used to broadcast transit stop information. The present invention creates a new advertising opportunity on transit vehicles then sells the new advertising media to advertisers and shares advertising revenue with transportation authorities, helping to balance their budgets without negative impacts on commuters or communities.

Figure 2:
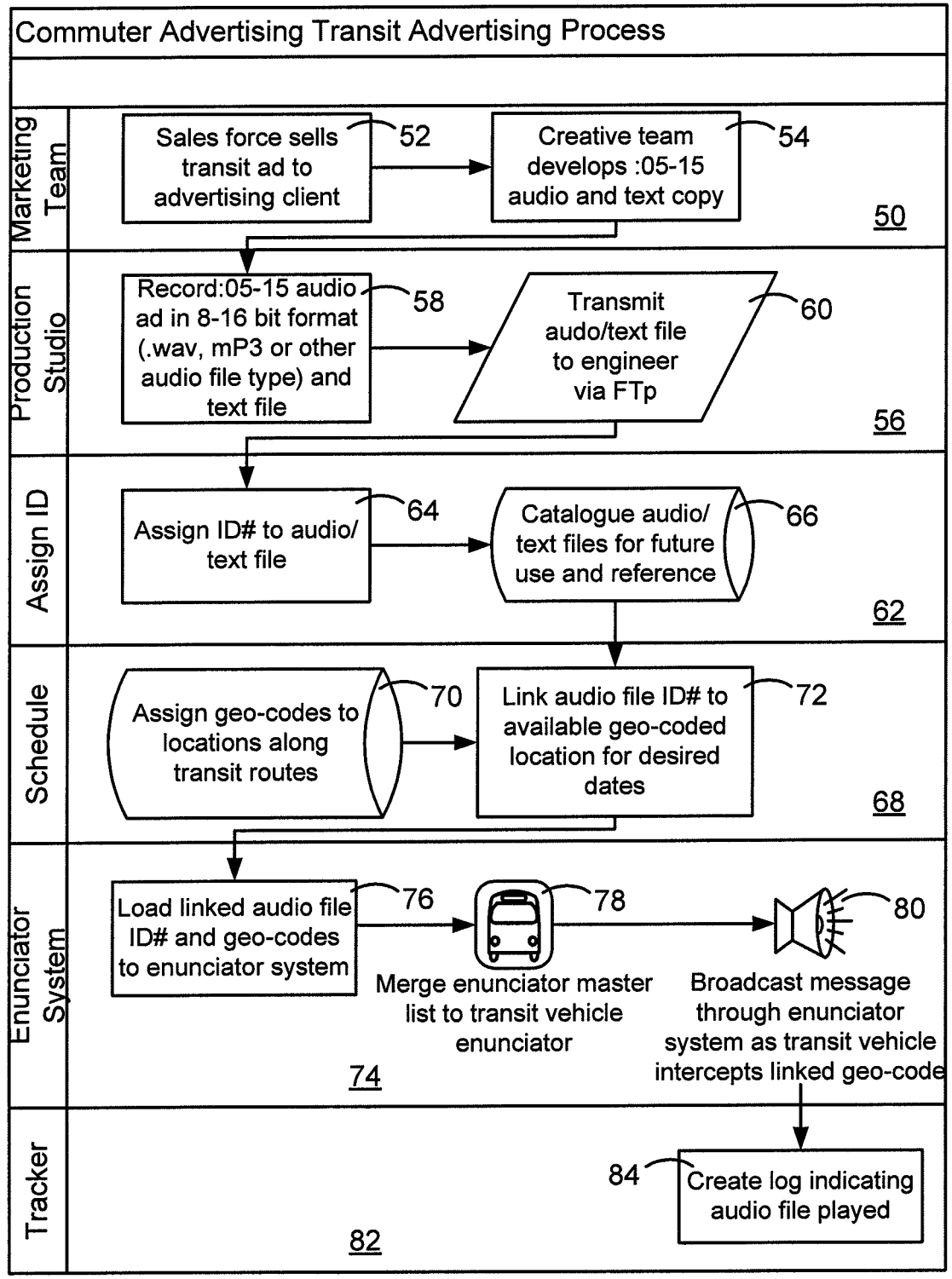
FIG. 2 is a schematic representation of the method of preparing and disseminating advertising on a transit system.

Referring now to FIG. 2, the method of the present invention represents an improvement to the prior art methods of using transit scheduler and enunciator tools. In the present invention these tools and processes are used as they have never before been used, that is for the purpose of creating advertising broadcast media that results in increased operating revenue of transportation authorities. Previously scheduler and enunciator tools were limited to the creation of transit stop and public service announcements. The method of the present invention allows advertising messages to be seamlessly adapted to current transit technology. The messages of the present invention are intended to be flexible and simple to implement. In the method, as seen in FIG. 2, a marketing team 50 can be assigned to an area or region through which a mass transit line flows. The marketing team 50 identifies clients and sells transits ads to the clients 52. The information on the client and the desired products or services are then forwarded to a creative team 54 to formulate the advertisement. Within a production studio 56, the advertisement 58 is created and formulated into the correct electronic media file-type 60. The advertisement is then sent to assignment area for identification 62, where an identification number is assigned 64 and the advertisement is cataloged 66.

The advertisements once cataloged can next be scheduled 68 for playback, by assigning appropriate geo-codes related to the physical location where playback will begin 70 along with a link 72 for the appropriate advertisement to be played at that location. The load linked audio file identification number and the geo-code are sent to the enunciator system 74 of the transit vehicle. The information is merged with the master list 76 and uploaded to the enunciator 78. At the appropriate time and place the advertising message is played 80. A log file is created 84 to track 82 the advertisements announced so as to provide billing information and data to the system and the advertiser.

Figure 3:
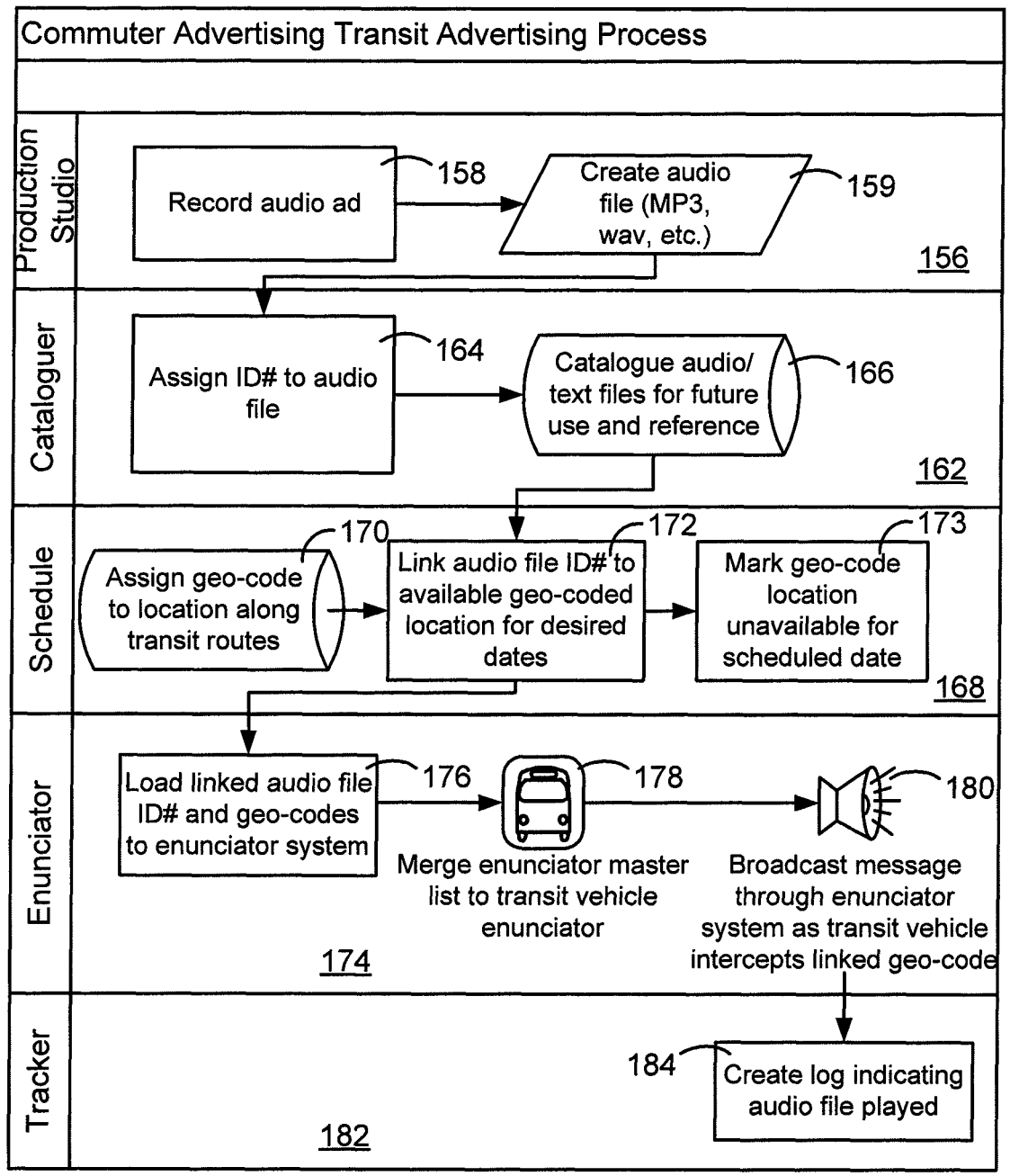
FIG. 3 is a schematic representation of the method of creating an advertisement for use in a transit system.

Referring to FIG. 3, it will be seen that a similar system, numbered with like numbers is shown, to include data so that along with scheduling the playing of the advertisement, quite or non-play times can also be scheduled. The method utilized in this example of the present invention, includes creation of the advertisement within a production studio 156; therein the advertisement 158 is created and formulated into the correct electronic media file-type 159. The advertisement is then sent to assignment area for identification 162, where an identification number is assigned 164 and the advertisement is cataloged 166.

The advertisements once cataloged can next be scheduled 168 for playback, by assigning appropriate geo-codes related to the physical location where playback will begin 170 along with a link 172 for the appropriate advertisement to be played at that location. So that the scheduled playback is not tedious or otherwise annoying to passengers, at this point locations where playback will not be made are geo-coded and placed in the system 173, so as to operate the advertising message system in a staggered seemingly random manner. The load linked audio file identification number and the geo-code, including non-play codes, are sent to the enunciator system 174 of the transit vehicle. The information is merged with the master list and uploaded to the enunciator 178. At the appropriate time and place the advertising message is played 180. A log file is created 184 to track 182 the advertisements announced so as to provide billing information and data to the system and the advertiser.

In addition to the above noted, the invention can include the following features in their entirety of in desirable combinations as will be know to persons having ordinary skill in the art.

Priority Announcements: adopters of the invention can work with local transit authorities to develop an agreed-upon list of priority announcements so that the audio/visual advertisements play as a tier 2 priority level. Tier 1 priority messages can include safety announcements and stop requests. These announcements, as prioritized in one embodiment, will play before advertising messages. Furthermore, tier 1 messages may cancel advertising messages as needed or desired to effect a safe and comfortable transit system.

Text and Audio Grouping: the text file, created for use in the method of the present invention, is in accordance with the teachings of the invention, uploaded into the transit system software through the enunciator system. The text files are grouped with audio files allowing the text to scroll across the transit screen simultaneously as the audio announcement is played.

Message Timing: advertising messages can be timed to broadcast as follows:

In one embodiment, the advertising message is placed immediately after a stop announcement. This is achieved by attaching the advertising message to the transit stop message in the transit scheduler software In another embodiment a new 'pseudo' stop with a unique geo-code is created by the scheduler system and given its own ID in the transit audio system, separate from any existing transit stop. The advertising message is then assigned to the new 'pseudo' stop thereby allowing advertisements to play in-between transit stops at unique intervals along the route.

In another embodiment the advertising message is placed in queue immediately following a "Transit Stop Request" message, such as the pulling of a cable or pressing a button to request a stop. Upon the initiation of a transit stop request, and before the general transit stop announcement that would occur when the vehicle approached the next stop, the advertising message is broadcast. The regular transit stop message follows thereafter, and there may be a scheduled advertisement following.

Audio Volume Control: it will be understood, by persons having ordinary skill in the art, that typically a desirable sound level of equal or equivalent volume on each city bus or other transit vehicle can be had by controlling the master volume control that is typically installed in modern enunciator systems in transit vehicles.

Fleet-wide Advertising Broadcast: transit scheduler and enunciator tools are typically used to create location-based broadcasts of stops. However, advertising message of the present invention can also be broadcast fleet-wide at specified times utilizing the same scheduler and enunciator tools. The method to create fleet-wide advertising messages mirrors the process for fleet-wide public service announcements currently made by transit systems, as is known by persons having ordinary skill in the art.

It will be understood by persons having ordinary skill in the art that the present invention includes newly developed methods that work with current technologies. The system is also adaptable to technologies that can be adopted for use in transit systems for these purposes. Such technologies include: automated systems to improve the process of inputting advertising messages in the transit scheduler and enunciator system; systems that creates a digital stamp after an advertising message is broadcast so as to be able to track the advertisement; enhanced 'minor-merge' processes that occurs more frequently such as hourly or daily; and increased flexibility for messages by location by time and date. In one embodiment of this aspect of the present invention, an advertiser desires to purchase advertisements at a bus stop such that the advertisement is only broadcast during the 9:00 am hour on Mondays. Perhaps the advertiser is running a special on a product or service on Mondays. In this embodiment, an Management Information Systems (MIS) Director for each transit agency would have the ability to send audio advertising files to desired stops such that an advertisement would play only for buses that pass the specified geo-coded spot during the 9:00 am hour. It will be understood that the particular hour is used for illustrative purposes and that any time could be selected without departing from the novel scope of the present invention.

Additionally, there are presently at least four companies that sell scheduler systems and audio enunciation systems to transit companies. The present method to provide advertising messages on transit vehicles is intended to be flexible to accommodate specific requirements across a variety of transit scheduler and enunciation tools available to transit authorities. It will be understood that the method is not limited to being compatible with these companies' software. Below is a list of the companies that provide the tools with which the user can integrate the devices found in some transit systems with the method of the present invention to create advertising message opportunities on transit vehicles:

Clever Devices of Plainview, N.Y. markets and sells the Automatic Voice Annunciation (AVA) program. Continental Automotive Systems US, Inc. of Cedar Rapids, Iowa markets and sells the Continental Transit Master (formerly Siemens Transit Master) to transit authorities. Orbital TMS of Columbia, Md. markets its ORB-CAS software that is available in a number of markets to transit authorities. Trapeze Software, Inc. of Ontario, Canada markets the Intelligent Trapeze Systems.

Figure 4:
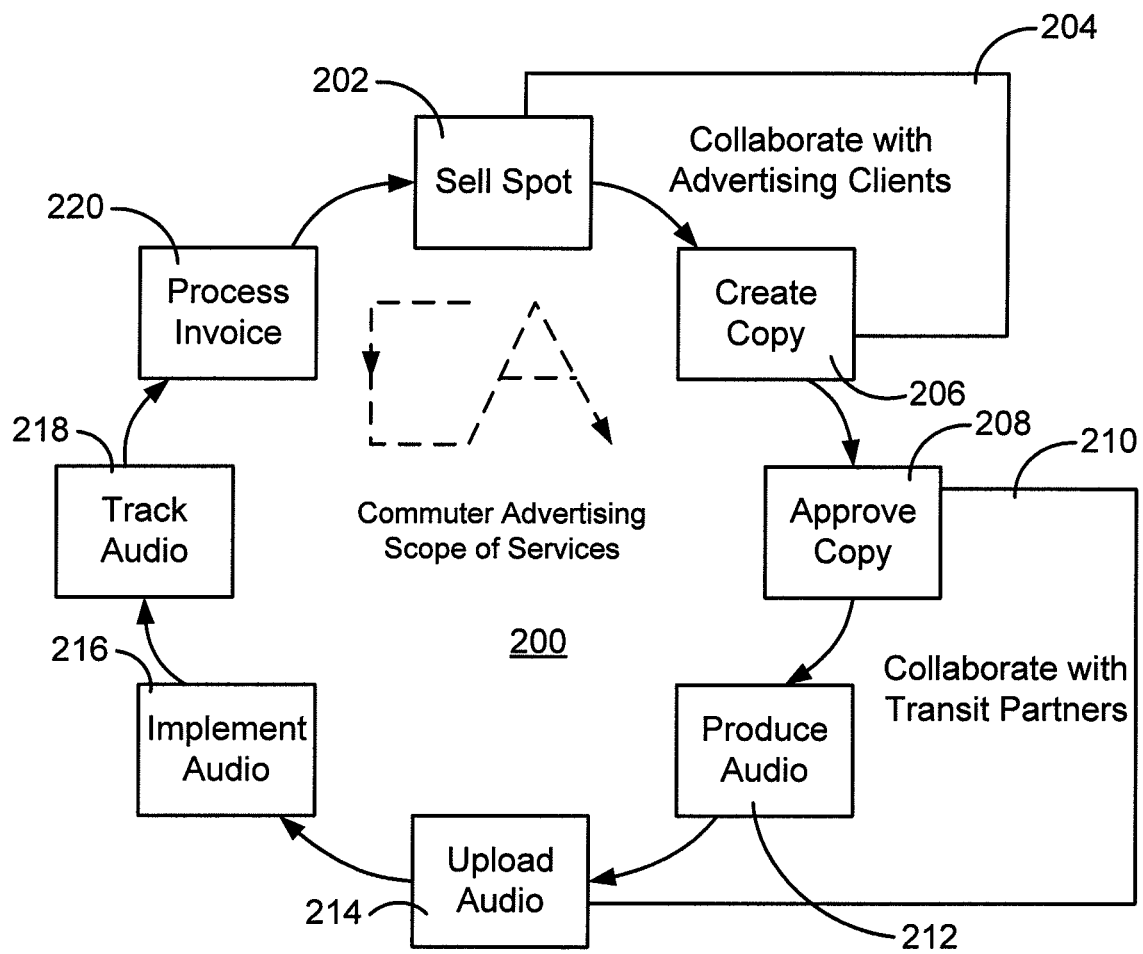
FIG. 4 is a schematic representation of the method of scheduling advertisements.
Figure 5A:
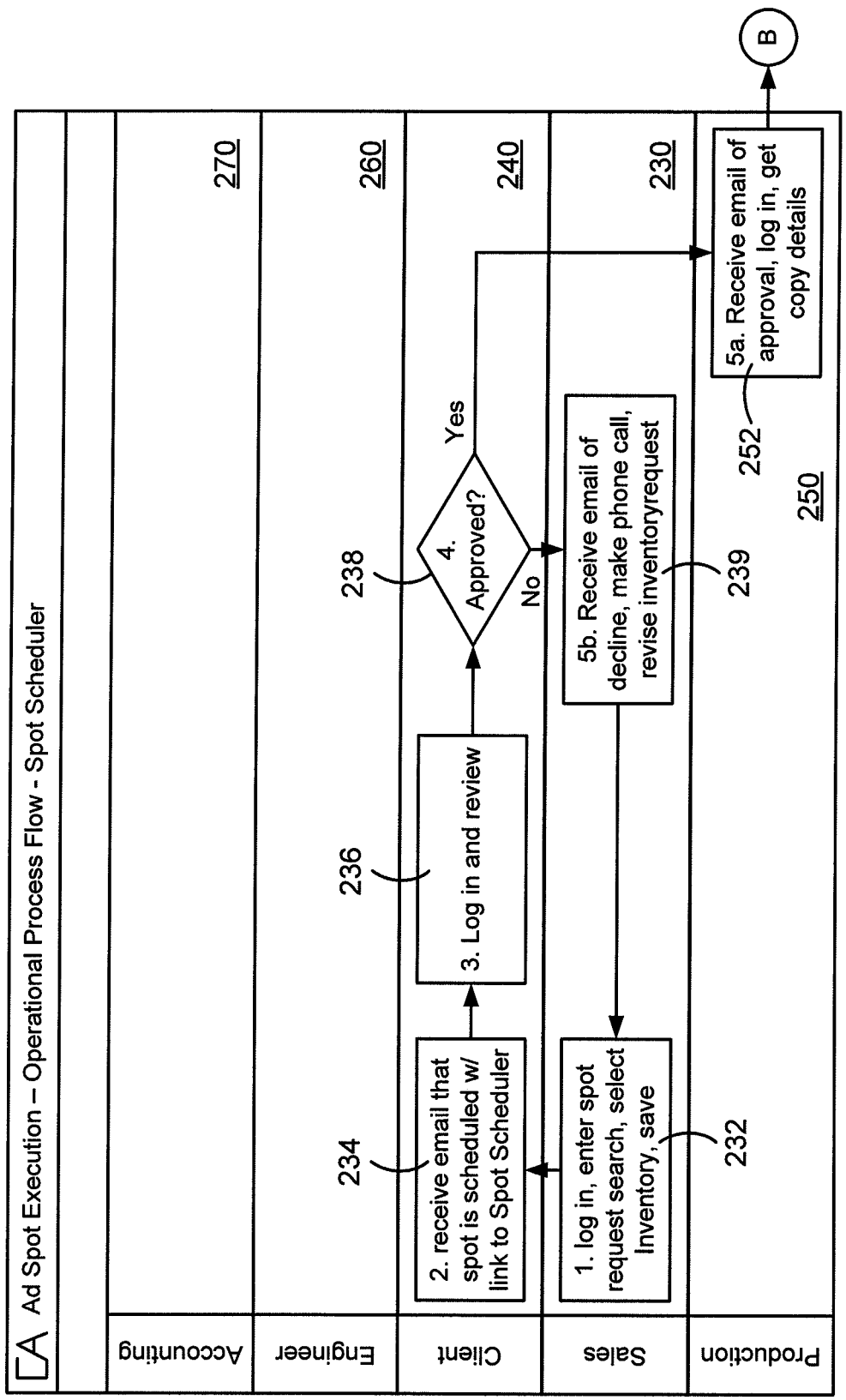
FIG. 5 is a schematic representation of the operational process flow for the scheduling method of the present invention.
Figure 5B:
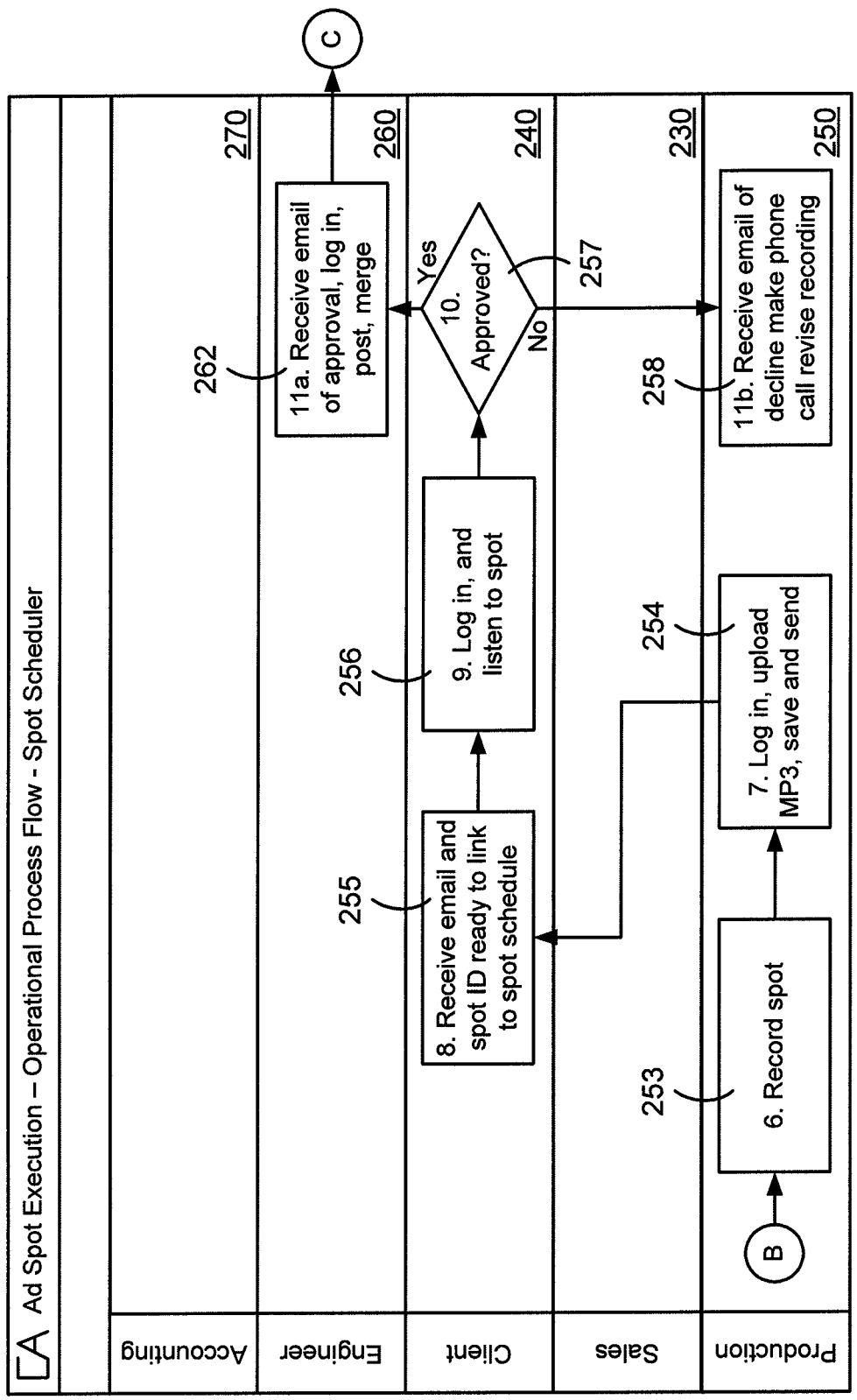
Figure 5C:
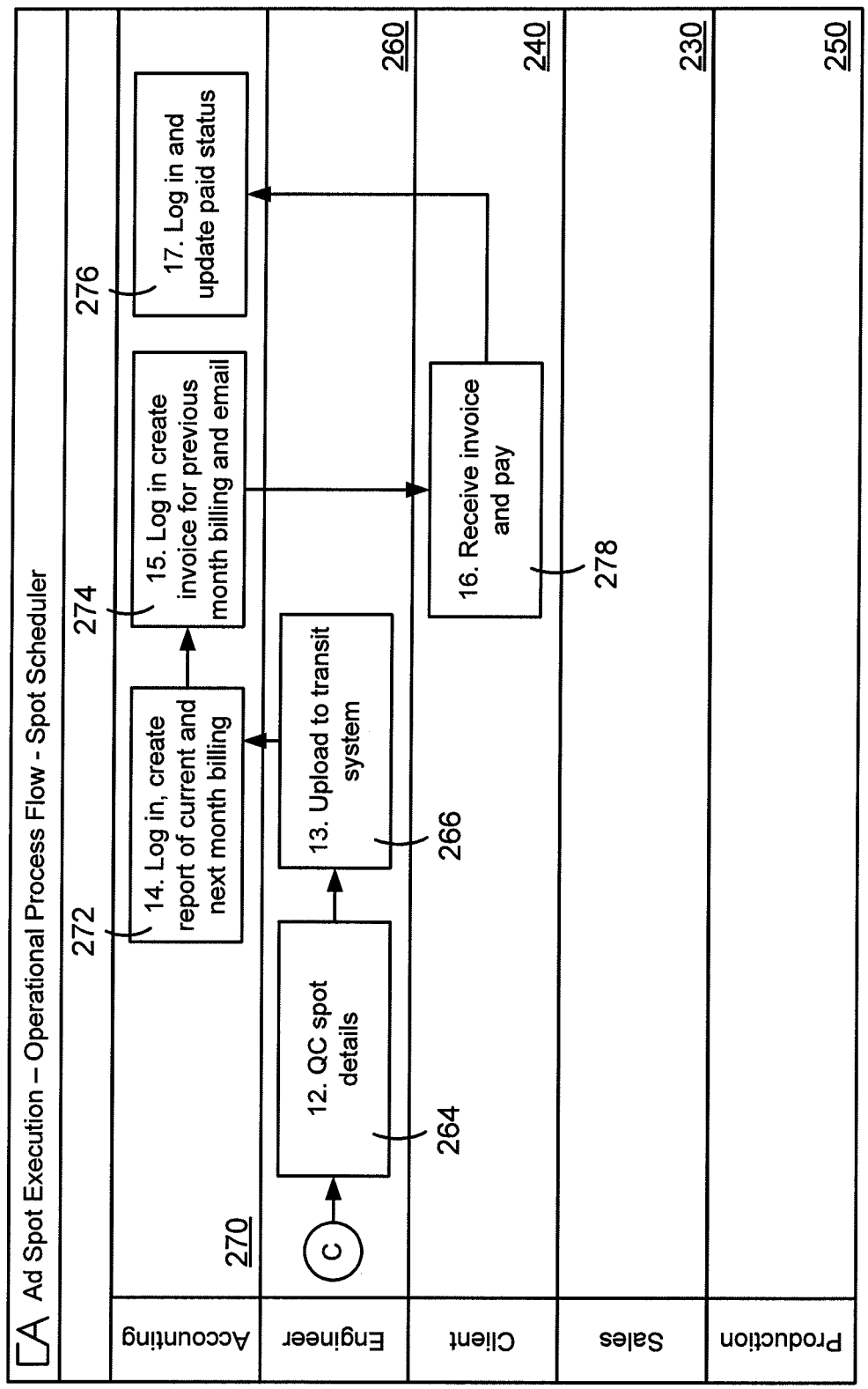

In addition to the methods described above that leverage existing transit tools and software to create advertising message broadcasts on transit vehicles, we have also developed tools designed specifically to manage the demands of selling a location-based transit advertising media and thereby increase the revenue of a transit system. We have conceptualized and developed programming to schedule advertisements. The advertising scope of services is shown below. A software program entitled Spot Scheduler™, created and owned by Commuter Advertising, Inc. of Chicago Ill., assignee of the present invention. The use of the Spot Scheduler™ software is illustrated in FIG. 4 and the operational flow for scheduling an advertisement is shown in FIG. 5. Spot Scheduler™ will ensure that ad spots are implemented resulting in client service, supporting the corporate objective to retain and grow existing relationships with advertising clients. Spot Scheduler™ will:
- Organize available inventory
- Identify available inventory
- Schedule advertising spots
- Automate invoicing to advertisers
- Ensure quality delivery of spots
- Facilitate spot invoicing
- Help sales proposals
  - Audio demos
  - Times
  - Locations
  - Lines
  - Promotions
  - Copy
  - Measures
- Help agencies/clients explore how ad spots align with
  - Business goals
  - Target markets
  - Target locations
- Help the spot buying process
  - Times
  - Locations
  - Lines
  - Copy Spot Scheduler™ will help sales staffs provide answers the following questions posed by advertisers:
- What spots should I buy?
  - What lines are my customers riding?
  - What time are my customers riding?
  - What stop are my customers
    - Getting on?
    - Getting off?
    - Riding past?
  - What stops are closest to my business?
  - What stops are closest to my competitors?
- Are my customers riding?
  - Ridership
    - Age
    - Income
    - Education
    - Gender Spot Scheduler™ will be used by:
- Internal Advertising
  - CA management
  - CA marketing
  - CA sales
  - CA accounting
  - CA Production
- External
  - Advertising clients
  - Transit clients
  - Media buyers Spot Scheduler™ will include the following data:
- Current available data
  - Stop #
  - Stop name
  - Stop coordinates
    - Latitude
    - Longitude
  - Bus line
  - Bus line frequency
  - Time of bus at stop
- New data
  - Client name
  - Client ID
  - Client address
  - Client coordinate
    - Latitude
    - Longitude
  - Branch name
  - Branch ID
  - Branch address
  - Branch coordinates
    - Latitude
    - Longitude
  - Contact name
  - Contact phone
  - Purchase date
  - Purchase type
  - Purchase stop
  - Scheduled dates
  - Rate
  - Total
  - Market
  - Transit authority
  - Transit contract
  - Demographics—market
  - Demographics—riders
    - By line
    - By stop
  - Sales contact name
  - Sales contact email
  - Manager contact name
  - Manager contact email
  - Production contact
  - Points of interest (for example)
    - Schools/universities
    - Businesses
    - Downtown Parks
Venues
Museums Referring now to FIG. 4, the flow process and the above noted elements of the process are described for the scope of services offered 200 are shown. It will be seen that a primary step scheduling an advertisement is selling an advertising spot 202 which is done in collaboration with advertising clients 204 to create appropriate copy 206. The copy is approved 208 in collaboration with transit partners (such as transit agencies) 210 and an audio clip of the advertisement is produced 212. The audio is uploaded 214, in the manner described above and implemented 216 into the transit system method described herein. The playing and effectiveness of the advertisement is tracked 218 and an invoice is produced and sent to the advertiser 220. While a particular process is shown and described it will be understood that various modifications can be made without departing from the novel scope of the present invention. Within these steps, and now referring to FIG. 5, the operational flow is illustrated.

As can be seen, an advertiser can contact or be contacted by a sales associate 230 upon which the associate can log into the scheduling software to determine if an advertising time is available for sale 232. Referring now to FIG. 6, a spot scheduler buy form 233 example is shown. The buyer can enter the data for its advertisement so that the copy and scheduling for the advertisement is facilitated. A message 234, as shown in FIG. 4, responding that a request for purchase of advertisement has been received, is sent to the client 240. As illustrated the message is sent via email; however it will be understood that any method of communication can be substituted therefore without effecting the novel scope of the present invention. When the communication is made by email, the client 240 is invited to log into the system and review 236 the ad's location. The location can then be approved 238 at which point the advertisement proceeds to production 250. If the spot is not approved the message declining the position is received 239 and begins the search for a new advertisement time.

Within production 250, as explained above, approval is received 252 and a record spot is created 253 and logged and uploaded 254 for review by the client 240. The advertisement is sent to the client 240 who receives 255 a request to review the advertisement and then logs into the system 256 to review the ad and approve 257 or decline the ad 258. If the ad is approved it is forwarded to an engineer 260 as an email approval 262. If the ad is declined it is returned 258 to production 250 to begin the production process again.

The engineer 260 receives the approved ad 262 and checks its quality 264 before uploading it 266 to the transit system in accordance with the approved schedule for play 238. Once the ad reaches the scheduled play time, the accounting department 270 creates a log of the ad and time and creates reports of play and billing 272. An invoice is created 274 for the client and the client can either log into the system 276 and review and pay for its ads 278 or receive a bill 278 by other means, as know to persons having skill in the art.

Although an illustrative embodiment of the invention has been shown and described, it is to be understood that various modifications and substitutions may be made by those skilled in the art without departing from the novel spirit and scope of the invention.

What is claimed is:

1. A method of more advantageously assigning advertisement space in a moving public transit vehicle and thereby securing increased advertising revenues in a public transit system including the steps of providing:

a city bus having a transit route and a public address system capable of publicly providing to passengers on the bus either audio or video messages or both, with no added impetus from the vehicle passengers;

one or more localized advertising messages having video or audio messages or both, of between 5 and 15 seconds duration and having data relative to the location where on the route to dissemination the message, stored in their entirety within the vehicle in no specific order, targeted for dissemination to specific geographic locations on the transit route;

a global positioning system receiver, microprocessor and software to determine the time and geographic location along the transit route at which the advertising message will be provided through the public address system within the bus, the microprocessor programmed to continuously review all of the files in the electronic storage and compare data from the one or more advertising messages with at least the location of the bus and the time of day;

disseminating the message within the bus at the determined time and geographic location on the transit route; and, wherein revenue is increased by charging an increased fee to an advertiser promulgating the advertising message for the dissemination of the advertising message at the targeted specific geographic locations.

2. The method of claim 1, including wherein the video message is disseminated almost simultaneously with the audio advertising message.

3. A method of more advantageously assigning advertising space in a moving public transit vehicle and thereby securing increased advertising revenue, including the steps of:

providing a public transit vehicle having a public address system, comprising at least a speaker and a means to cause sounds to be heard by passengers throughout the vehicle, with message storage and playback devices, the playback devices addressing the entire passenger portion of the transit vehicle;

providing a microprocessor, a global positioning system (GPS), an electronic storing device for storing advertising messages comprising data including location and business hour data, software and a communication device all traveling with the public transit vehicle, the microprocessor programmed to continuously reviewing one or more advertising messages in the electronic storing device and compare data from the advertising message against GPS information continuously received;

providing storage and public playback of advertising messages on the public address system on the public transit vehicle;

creating the advertisement and producing an audio message, comprising advertisement information and at least location and time data;

storing the audio message and data in the message storage device of a public transit vehicle for continuous review by the microprocessor and playback through the transit vehicle public address system;

determining with the microprocessor, the GPS and the location and business hour data in the advertising message, the one or more geographic locations on the route of the public transit vehicle at which the advertising message can be played and mapping those one or more geographic locations on a public transit system map in the electronic storing device for review by the microprocessor and playback at desired times and geographic locations;

playing, with no added impetus from the vehicle passengers, the advertising message at the one or more of the predetermined geographic locations, and charging an increased fee to an advertiser promulgating the advertising message for the dissemination of the advertising message at the targeted geographic location.

4. The method of claim 3, including the step of allowing, for a determined price, an advertiser to designate the time and geographic location, on the transit map, at which an audio message will be played and playing the audio message at the designated time and the geographic location designated by the advertiser.

5. The method of claim 3, including the step of playing the advertising message at staggered intervals.

6. The method of claim 5, wherein the interval can be determined to include the known time necessary for a vehicle to travel between at least one stop, the interval being continuously changeable so as to alter the number of stops between the playback of the advertising messages.

7. The method of claim 5, wherein the interval is appropriate as determined by a number of potential factors including transit authority policies or preferences, revenue goals, or commuter feedback.

8. The method of claim 3, including the step of providing a video message in addition to the audio message.

9. The method of claim 8, wherein the public address system of the vehicle includes means to electronically display a message.

10. The method of claim 9, wherein the means to display is an electronic dot matrix view screen.

11. The method of claim 9, wherein the means to display is a flat screen viewing panel.

12. A method of more advantageously assigning audio and/or video advertisement space in a moving public transit vehicle and thereby securing increased advertising revenue, comprising:

a public transit vehicle having a route and a public address system comprising at least a speaker and means to cause sounds to be heard by passengers throughout the vehicle, the system configured to address an entire transit vehicle, with no added impetus from the vehicle passengers;

a microprocessor, a global positioning system (GPS), an electronic storing device and a communication device all traveling with the public transit vehicle, the microprocessor programmed to continuously review one or more files in the electronic storing device and compare data from the one or more files against GPS information continuously received;

the one or more files having specific advertising messages and data associating the message, including location information and the hours of operation of an advertiser, stored entirely within the electronic storing device, each message being associated with location information data to at least one specific geographic location along the route associated, by including an address of an advertiser's location within a set distance from the vehicle route and data associated with the hours of operation at the address, with the advertising messages for public dissemination through the vehicle's public address system;

software, to cause the microprocessor to determine when an advertising message should be disseminated based on one or more of location, as determined by the GPS and the location data stored with the message in the electronic storing device, time of day, numbers of advertiser locations, elapsed time on the route and the number of requested disseminations bought by the advertiser in a purchase order;

determining with the microprocessor, the GPS and software, the precise times and geographic locations for disseminating a selected advertising message and then disseminating, one or more times, within the transit vehicle the message through the public address system within the vehicle at the microprocessor, GPS, data and software determined times and geographic locations near one or more address of the advertiser on the vehicle route;

continuously running the method so as to disseminate appropriate messages throughout the transit route such message having no specifically prescribed order;

including the use of one advertising message more than once, the microprocessor, GPS and software being used to selectively choose the particular advertising message for transmission repeatedly, either consecutively or at intervals with other advertising messages between, in association with the vehicles proximity to one or more locations of the advertiser; and charging increased fees to the advertisers promulgating the advertising messages for the particular service of dissemination of each advertising message at a targeted geographic location.

13. The method of claim 12, wherein the transit vehicle is a bus.

14. The method of claim 12, wherein the transit vehicle comprises a train car.

15. The method of claim 12, wherein the transit vehicle public address system includes both audio and visual message delivery.

16. The method of claim 12, wherein the advertising message disseminated comprises between 5 and 15 words.

17. A method of more advantageously assigning audio and/or video advertisement space in a moving public transit vehicle and thereby securing increased advertising revenue, comprising:

a public transit vehicle having a route and a public address system comprising at least a speaker and means to cause sounds to be heard by passengers throughout the vehicle, the system configured to address an entire transit vehicle, with no added impetus from the vehicle passengers;

microprocessor, a global positioning system (GPS), an electronic storing device and a communication device all traveling with the public transit vehicle, the microprocessor programmed to continuously review one or more files in the electronic storing device and compare data from the one or more files against GPS information continuously received;

the one or more files having specific advertising messages and data associating the message, including location information and the hours of operation of an advertiser, stored entirely within the electronic storing device, each message being associated with location information data to at least one specific geographic location along the route associated, by including an address of an advertiser's location within a set distance from the vehicle route and data associated with the hours of operation at the address, with the advertising messages for public dissemination through the vehicle's public address system;

software, to cause the microprocessor to determine when an advertising message should be disseminated based on one or more of location, as determined by the GPS and the location data stored with the message in the electronic storing device, time of day, numbers of advertiser locations, elapsed time on the route and the number of requested disseminations bought by the advertiser in a purchase order;

determining with the microprocessor, the GPS and software, the precise times and geographic locations for disseminating a selected advertising message and then disseminating, one or more times, within the transit vehicle the message through the public address system within the vehicle at the microprocessor, GPS, data and software determined times and geographic locations near one or more address of the advertiser on the vehicle route;

continuously running the method so as to disseminate appropriate messages throughout the transit route such message having no specifically prescribed order;

charging increased fees to the advertisers promulgating the advertising messages for the particular service of dissemination of each advertising message at a targeted geographic location; and wherein files comprising the advertising messages of the entire transit system are installed into the electronic storing device of the transit vehicle such that the transit vehicle can move to a different route, or go off route, and continuously provide localized advertisements wherever it transits.

18. The method of claim 17, wherein the transit vehicle is a bus.

19. The method of claim 17, wherein the transit vehicle comprises a train car.

20. The method of claim 17, wherein the transit vehicle public address system includes both audio and visual message delivery.

21. The method of claim 17, wherein the advertising message disseminated comprises between 5 and 15 words.

* * * * *